United States Patent
Wellmann et al.

(10) Patent No.: US 11,842,391 B2
(45) Date of Patent: *Dec. 12, 2023

(54) SYSTEMS AND METHODS FOR ANALYZING DOCUMENTS USING MACHINE LEARNING TECHNIQUES

(71) Applicant: FIDELITY INFORMATION SERVICES, LLC, Jacksonville, FL (US)

(72) Inventors: Benjamin Wellmann, Boca Raton, FL (US); Zachary Jasinski, Milwaukee, WI (US); Matthew Petersen, Apex, NC (US); Eric Bond, Whitefish Bay, WI (US); Daniel Wakeman, Jacksonville, FL (US); David Berglund, Ponte Vedra, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,300

(22) Filed: Apr. 16, 2021

(65) Prior Publication Data
US 2022/0335517 A1    Oct. 20, 2022

Related U.S. Application Data

(63) Continuation of application No. 17/233,251, filed on Apr. 16, 2021, now Pat. No. 11,645,712.

(51) Int. Cl.
*G06Q 40/00* (2023.01)
*G06Q 40/03* (2023.01)
(Continued)

(52) U.S. Cl.
CPC ............. *G06Q 40/03* (2023.01); *G06F 9/547* (2013.01); *G06F 40/20* (2020.01); *G06N 20/00* (2019.01)

(58) Field of Classification Search
CPC ...... G06Q 40/02; G06Q 40/025; G06Q 40/03; G06N 20/00; G06F 40/20
(Continued)

(56) References Cited

U.S. PATENT DOCUMENTS

2009/0033737 A1   2/2009   Goose et al.
2010/0085416 A1   4/2010   Hegde et al.
(Continued)

OTHER PUBLICATIONS

International Search Report and Written Opinion in counterpart Application No. PCT/US2022/025049 dated Jul. 11, 2022 (17 pages).

*Primary Examiner* — Jessica Lemieux
*Assistant Examiner* — Mohammed H Mustafa
(74) *Attorney, Agent, or Firm* — FINNEGAN, HENDERSON, FARABOW, GARRETT & DUNNER LLP

(57) ABSTRACT

Systems and methods for activity risk management are disclosed. A system for activity risk management may include a memory storing instructions and at least one processor configured to execute instructions to perform operations including: accessing document data associated with at least one of a transaction or an individual; normalizing the document data; classifying the normalized document data; extracting model input data from the classified document data; applying a machine learning model to the extracted model input data to score the document data, the machine learning model having been trained to generate a favorability output indicating a favorability of the transaction or individual; and generating analysis data based on the scored document data.

16 Claims, 11 Drawing Sheets

(51) Int. Cl.
*G06F 9/54* (2006.01)
*G06F 40/20* (2020.01)
*G06N 20/00* (2019.01)

(58) Field of Classification Search
USPC .................................. 705/4, 35–45
See application file for complete search history.

(56) References Cited

U.S. PATENT DOCUMENTS

| | | | |
|---|---|---|---|
| 2017/0206604 A1* | 7/2017 | Al-Masoud | G06Q 40/08 |
| 2019/0068632 A1* | 2/2019 | Foster | H04L 63/1433 |
| 2020/0134735 A1* | 4/2020 | Carver | G06Q 40/08 |
| 2020/0285754 A1* | 9/2020 | Kassoumeh | G06Q 10/0635 |
| 2021/0342758 A1* | 11/2021 | Ripley | G06Q 10/0637 |
| 2021/0374754 A1* | 12/2021 | Pandian | G06Q 20/4016 |

* cited by examiner

700A

| Ranked List | Risk Concentrations | Requests For Records | Reports |

List Definition

Geographic Region
[All Regions ∨]

Score
[Aggregate Risk Score ∨]

Peer Group
[All Peer Groups ∨]

List Order
[Highest risk score to lowest risk score ∨]

( Refresh The List )

Selected Banks by Risk Score
2,527 banks meet your selection criteria.

[Bank Search 🔍]

| Aggregate Risk Score ◆ | Bank Name and ID ◆ | System-Wide Risk Percentile ◆ | 1-Month Score Chg ◆ | 3-Month Score Chg ◆ | 6-Month Score Chg ◆ | 12-Month Score Chg ◆ | Last Records Request ◆ |
|---|---|---|---|---|---|---|---|
| 4.75 as of today | Windy Mountain Bank 01234 | 99th High risk | 0.75 | 0.60 | 1.77 | 1.91 | 11/1/2020 Go to Digital Examiner |
| 4.71 as of today | Codename Bank 12345 | 99th High risk | 0.70 | 0.50 | 1.67 | 1.81 | |
| 4.67 as of today | National Republic Bank of Rumib 23456 | 99th High risk | 0.62 | 0.01 | 1.37 | 1.65 | 12/1/2020 in process |
| 4.41 as of 12/11/2020 | RSST Financial 34567 | 99th High risk | 0.59 | 0.07 | 1.75 | 1.80 | |

Items per page: [10 ∨]   1-10 of 2,527   |< < > >|

FIG. 7A

Search Results

Windy Mountain Bank, 01234
Loan Type Residential  Amount category 100K to 250K,  Delinquency/charge-off category 30 to 89 days and accruing,
real estate                500K to 1M                                                       90 days or more and accruing 10 matching accounts ✕

| ■ Account | Product | Call Code | Name | Original Amount Category | Delinquency Category | Days Late | Maturity Date | Repricing Date | Va... |
|---|---|---|---|---|---|---|---|---|---|
| ☐ 12356100 | Residential Real Estate Loan | 1c/[2]a.Closed-end 1-4 family (1st lien) | WALLY HOMES LLC | Original amount 100K to 250K | 30 thru 89 days and accruing | 45 | 10/16/2030 | 10/16/2030 | No |
| ☐ 12356200 | Residential Real Estate Loan | 1c/[2]a.Closed-end 1-4 family (1st lien) | WALLY HOMES LLC | Original amount 100K to 250K | 30 thru 89 days and accruing | 45 | 10/16/2030 | 10/16/2030 | No |
| ☐ 12401300 | Residential Real Estate Loan | 1c/[2]a.Closed-end 1-4 family (1st lien) | WALTER HART | Original amount 500K to 1M | 90 days or more and accruing | 107 | 6/25/2035 | 6/25/2035 | No |
| ☐ 12401500 | Residential Real Estate Loan | 1c/[2]a.Closed-end 1-4 family (1st lien) | JONES CARR LLC | Original amount 100K to 250K | 30 thru 89 days and accruing | 69 | 12/30/2028 | 12/30/2028 | No |

( Create New Binder )  ( Add to Existing Binder )

SYSTEMS AND METHODS FOR ANALYZING DOCUMENTS USING MACHINE LEARNING TECHNIQUES

CROSS-REFERENCE TO RELATED APPLICATIONS

This application is a continuation of U.S. patent application Ser. No. 17/233,251, filed on Apr. 16, 2021. The disclosure of the above-referenced application is expressly incorporated herein by reference in its entirety.

TECHNICAL FIELD

The present disclosure generally relates to computerized methods and systems for analyzing documents and, more particularly, to computerized systems and method for using computerized modeling to analyze extracted document data and predict institutional risks.

BACKGROUND

In current environments, there are many areas where an organization may seek to have a degree of monitoring over particular activities of other organizations, especially when those activities have the potential for institutional risk (e.g., damage to an organization, harm to consumers, etc.). In some cases, human monitors attempt to identify institutional risk by gleaning information from documents of the organization. However, to identify these risks using current techniques, individuals must manually review thousands of pages of documents, sometimes failing to identify key risk-impacting information, and often failing to identify connections or correlations between documents. Sometimes, such manual review may be so error-prone or slow to the point where an institutional risk is not identified or mitigated before becoming realized by an institution. Moreover, such manual review can make it difficult to identify trends within an organization that may indicate a change in institutional risk. In many cases, important documents are often scattered across multiple physical locations, requiring larger amounts of manpower to perform complete review. Even in cases where rudimentary computerized systems are used to aid document review, such systems operate inefficiently, such as by not fully understanding a particular document type or subject matter, which can aid in risk analysis.

In other environments, an organization may seek to have a degree of monitoring over its own activities, to identify institutional risks to its own operations. However, in these instances, organizations often suffer from the drawbacks discussed above. Moreover, an organization may benefit from analysis of documents to identify institutional risks using data aggregated from multiple organizations, such as from other organizations operating in a similar industry, but this may be hindered by difficulty sharing documents that include personally identifiable information (PII).

In some cases, organizations may receive large amounts of analysis information that includes unneeded or ill-formatted information. When received through a computer network, such unneeded information burdens network bandwidth. Additionally, ill-formatted information may be unusable by an organization, or may unnecessarily burden processing resources to convert into a useable format.

Therefore, a need exists in the institutional risk management industry to provide customizable, correctly tailored, rapid, and accurate risk analysis information. The present disclosure is directed to addressing these and other challenges.

SUMMARY

One aspect of the present disclosure is directed to a computer-implemented system for entity risk management. The system comprises a non-transitory computer-readable medium configured to store instructions and at least one processor configured to execute the instructions to perform operations. The operations include establishing a connection between the system and a data source, the data source being remote from the system and associated with a first entity; receiving first institution data from the data source; extracting model input data from the institution data using a natural language processing (NLP) classifier; applying a machine learning model to the extracted model input data to predict a risk level associated with the first entity, the machine learning model having been trained to predict risk levels using second institution data; generating analysis data based on the predicted risk level; and based on the analysis data, transmitting an alert to a management device communicably connected to the system.

Another aspect of the present disclosure is directed to a computer-implemented system for activity risk management. The system comprises a non-transitory computer-readable medium configured to store instructions and at least one processor configured to execute the instructions to perform operations. The operations include accessing document data associated with at least one of a transaction or an individual; normalizing the document data; classifying the normalized document data; extracting model input data from the classified document data; applying a machine learning model to the extracted model input data to score the document data, the machine learning model having been trained to generate a favorability output indicating a favorability of the transaction or individual; and generating analysis data based on the scored document data.

Another aspect of the present disclosure is directed to a computer-implemented system for providing selective access to model output data. The system comprises a non-transitory computer-readable medium configured to store instructions and at least one processor configured to execute the instructions to perform operations. The operations include receiving, through an application programming interface (API) and from a requestor device, an API request for data, the API request identifying a requestor entity associated with the requestor device; determining a data type based on the API request; determining an authorization level of the requestor; accessing first model output data corresponding to the data type and the authorization level, the first model output data having been generated by a machine learning model trained to predict a risk level based on document data; and transmitting the first model output data to the requestor device.

Other aspects of the present disclosure are directed to methods for performing the functions of the computer-implemented systems discussed above.

Other systems, methods, and computer-readable media are also discussed herein.

BRIEF DESCRIPTION OF THE DRAWINGS

FIGS. 7A, 7B, 7C, and 7D depict example interfaces presented on user device 300, consistent with the disclosed embodiments.

DETAILED DESCRIPTION

Figure 1:
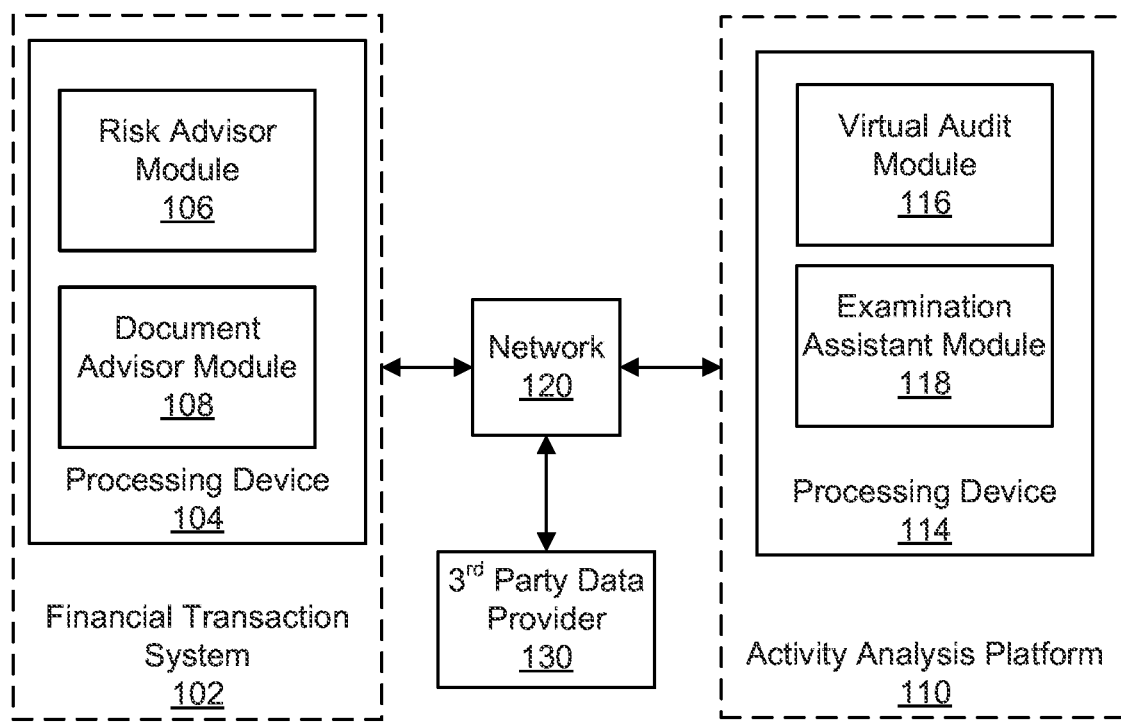
FIG. 1 is a schematic diagram of an example system architecture for predicting risk, consistent with the disclosed embodiments.

The disclosed embodiments include systems and methods for processing financial transactions. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

FIG. 1 is a schematic diagram illustrating an example system architecture 100 for predicting risk, consistent with the disclosed embodiments. For example, system architecture 100 may predict risk related to one or more institutions, such as a bank, a lender, a check clearinghouse, a financial advisement entity, a business (e.g., an automobile dealership), a hospital, a healthcare provider, or other organization. As discussed below, system architecture 100 may analyze document data to predict associated risks. Devices within system architecture 100 may include at least one module (examples of which are discussed below), which may include a program, code, model, workflow, process, thread, routine, coroutine, function, or other processing element for predicting outcomes based on document data.

In some embodiments, system architecture 100 may include a financial transaction system 102, which may exist fully or partially within a bank or other institution. While this system has been termed as a financial transaction system, this term is merely exemplary, as embodiments exist where financial transaction system 102 may be associated with financial information not related to transactions, or may be related to information not related to finance. In some embodiments, financial transaction system 102 may include at least one processing device 104, which may be an instance of server 200 and/or user device 300. Processing device 104 may carry out all or any portion of the processes described herein. In some embodiments, financial transaction system 102 may include multiple processing devices 104, which may be communicably coupled through any kind of suitable wired and/or wireless local area network (LAN). In some embodiments, financial transaction system 102 may also utilize cloud computing technologies (e.g., for storage, caching, or the like).

In some embodiments, processing device 104 may include a risk advisor module 106, which may be stored in memory 230 or memory 330 (discussed further below). In some embodiments, risk advisor module 106 may be configured to carry out all or part of process 400, described below. In some embodiments, risk advisor module 106 may provide analysis information and/or recommendations, discussed below, to a device within financial transaction system 102. For example, processing device 104 may provide analysis results to risk advisor module 106.

In some embodiments, processing device 104 may include a document advisor module 108, which may be stored in memory 230 or memory 330 (discussed further below). In some embodiments, document advisor module 108 may be configured to carry out all or part of process 500, described below. In some embodiments, document advisor module 108 may be configured to examine a particular type of document, such as a loan application paper. In some embodiments, risk advisor module may provide analysis information, including recommendations, discussed below, to a device within financial transaction system 102.

While shown within the same processing device 104 as risk advisor module 106, it should be noted that risk advisor module 106 and document advisor module 108 may be present on separate processing devices 104. Moreover, a processing device 104 may include multiple risk advisor modules 106, document advisor modules 108, or any other module configured for implementing part of a process discussed herein. For example, a processing device 104 may include multiple document advisor modules 108 associated with examining different types of documents (e.g., loan applications, account applications, withdrawal requests, transfer requests, personnel documents, etc.).

In some embodiments, financial transaction system 102 may be communicably connected with activity analysis platform 110. For example, financial transaction system 102 may connect with activity analysis platform 110 through network 120. Network 120 may be a public or private network, and may include, without limitation, any combination of a Local Area Network (LAN), a Wide Area Network (WAN), a Metropolitan Area Network, an Institute of Electrical and Electronics Engineers (IEEE) 802.11 wireless network (e.g., "Wi-Fi"), wired network, a network of networks (e.g., the Internet), a land-line telephone network, a fiber optic network, and/or a cellular network. Network 120 may be connected to other networks (not depicted in FIG. 1) to connect the various system components to each other and/or to external systems or devices. In some embodiments, network 120 may be a secure network and require a password to access the network, or a portion of the network.

In some embodiments, system architecture 100 may include an activity analysis platform 110, which may be associated with generating analysis based on document data. In some embodiments, activity analysis platform 110 may include at least one processing device 114, which may be a server 200 and/or user device 300. Processing device 114 may carry out all or any portion of the processes described herein. In some embodiments, activity analysis platform 110 may include multiple processing devices 104, which may be communicably coupled through any kind of suitable wired and/or wireless local area network (LAN). In some embodiments, activity analysis platform 110 may also utilize cloud computing technologies (e.g., for storage, caching, or the like).

In some embodiments, processing device 114 may include a virtual audit module 116, which may be stored in memory 230 or memory 330 (discussed further below). In some embodiments, virtual audit module 116 may be configured to carry out all or part of process 400, described below. In some embodiments, risk advisor module may provide analysis information and/or recommendations, discussed below, to a device within financial transaction system 102. In some embodiments, virtual audit module 116 may aggregate document data from multiple sources (e.g., multiple financial transaction systems 102) and may perform risk analysis based on data from a single source or aggregated from multiple sources. In some embodiments, virtual audit module 116 may operate periodically or continually, to regularly monitor organizations as new documents are examined. In some embodiments, virtual audit module 116 may determine that a risk analysis result satisfies an alert threshold and may transmit an alert to a device in system architecture 100.

In some embodiments, processing device 114 may include an examination assistant module 118, which may be stored in memory 230 or memory 330 (discussed further below). In some embodiments, examination assistant module 118 may be configured to carry out all or part of process 400, described below. In some embodiments, examination assistant module 118 may provide particularized analysis information and/or recommendations, which may be based on user input. In some embodiments, examination assistant module 118 may include a machine learning model that learns a user's (e.g., financial examiner's) preferences over time and adjusts analysis and/or display parameters in response. By way of example, a machine learning model may learn over time that a particular user (e.g., as identified by particular user credentials used at processing device 114) prefers to access particular types of documents when examining data underlying risk predictions, and may score the document types according to frequency of access, order of access, screen time spent on a particular document type, etc. Based on these learned preferences, the machine learning model may provide a list of documents to the user, where the documents are ranked according to strength of user preference scores. Additionally or alternatively, processing device 114 may provide certain analysis results using examination assistant module 118, which may be configured to provide charts, maps, lists, filters, or other tools for allowing a user to examine results (e.g., number of new loans over time, total assets over time, a relatively fast rate of change to an entity metric, a close timing between two events, etc.).

System architecture 100 may also include a $3^{rd}$ party data provider 130, which may store data that can be used by a tool (e.g., document data analyzer 232), consistent with disclosed embodiments. In some embodiments, $3^{rd}$ party data provider 130 may store data related to a particular field, such as demographics or economics. By way of example, $3^{rd}$ party data provider 130 may store statistics from the United States Department of Labor, such as statistics relating to employment or income. In some embodiments, a device within system architecture 100 may periodically extract up-to-date data from $3^{rd}$ party data provider 130, such that a module may have more accurate datasets, which can be used as input data for a module (e.g., model for predicting institutional risk, predicting favorability of a transaction or individual, etc.). In some embodiments, activity analysis platform 110 may be configured to (e.g., have multiple data intake modules for) download data from multiple $3^{rd}$ party data providers 130 and standardize the downloaded data into a format usable by a machine learning model (e.g., for use in process 400). A $3^{rd}$ party data provider 130 may also connect to activity analysis platform 110 through network 120.

Figure 2:
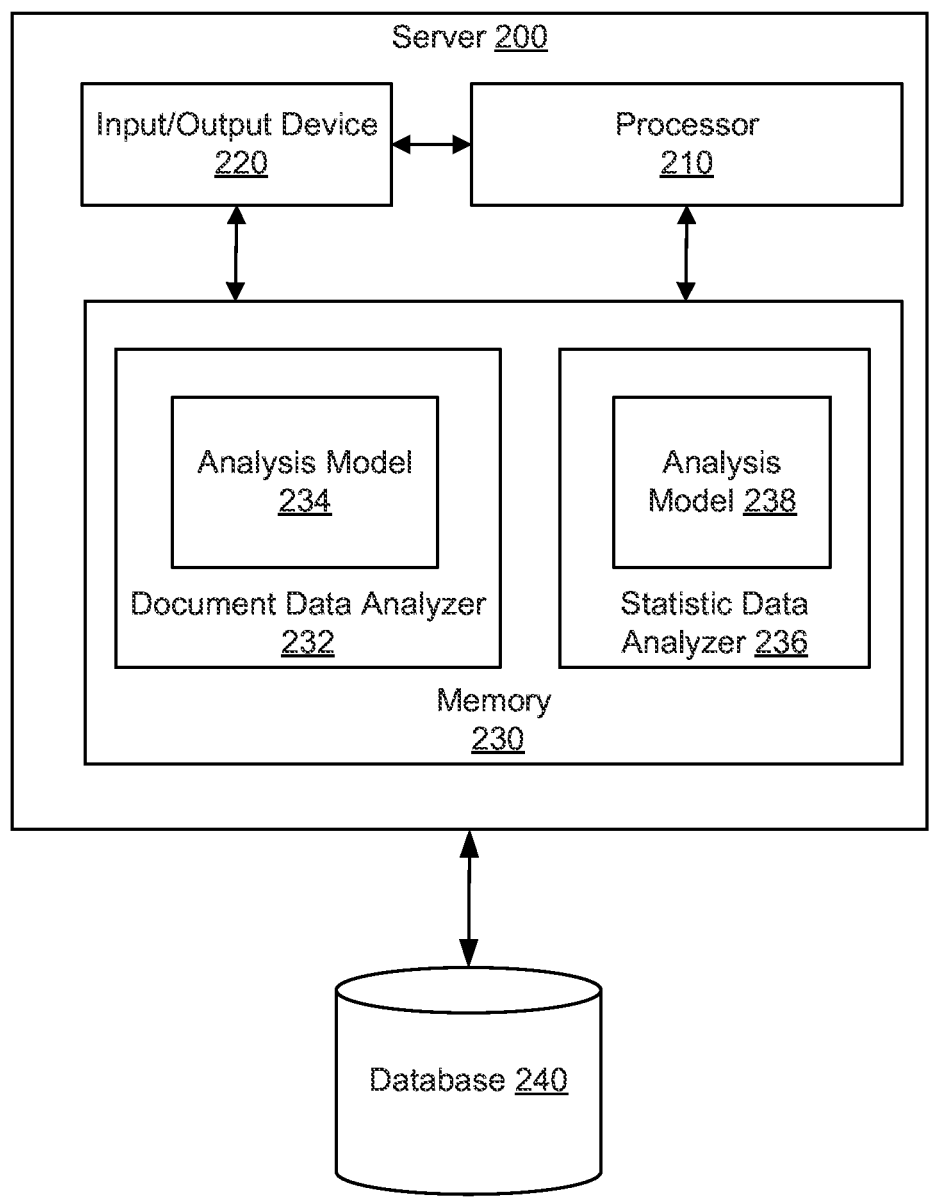
FIG. 2 is a block diagram of an example server for predicting risk, consistent with the disclosed embodiments.

FIG. 2 is a block diagram of an example server 200 used in system architecture 100, consistent with the disclosed embodiments. For example, server 200 may be used in financial transaction system 102 or activity analysis platform 110. Server 200 may be one or more computing devices configured to execute software instructions stored in memory to perform one or more processes consistent with the disclosed embodiments. For example, server 200 may include one or more memory devices for storing data and software instructions and one or more hardware processors to analyze the data and execute the software instructions to perform server-based functions and operations (e.g., back-end processes). In some embodiments, server 200 may be a virtual processing device (e.g., a virtual machine or a container), which may be spun up or spun down to satisfy processing criteria of financial transaction system 102, activity analysis platform 110, or other system.

In FIG. 2, server 200 includes a hardware processor 210, an input/output (I/O) device 220, and a memory 230. It should be noted that server 200 may include any number of those components and may further include any number of any other components. Server 200 may be standalone, or it may be part of a subsystem, which may be part of a larger system. For example, server 200 may represent distributed servers that are remotely located and communicate over a network.

Processor 210 may include or one or more known processing devices, such as, for example, a microprocessor. In some embodiments, processor 210 may include any type of single or multi-core processor, mobile device microcontroller, central processing unit, etc. In operation, processor 210 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 230, processor 210, or elsewhere.

I/O device 220 may be one or more devices configured to allow data to be received and/or transmitted by server 200. I/O device 220 may include one or more customer I/O devices and/or components, such as those associated with a keyboard, mouse, touchscreen, display, etc. I/O device 220 may also include one or more digital and/or analog communication devices that allow server 200 to communicate with other machines and devices, such as other components of system architecture 100. I/O device 220 may also include interface hardware configured to receive input information and/or display or otherwise provide output information. For example, I/O device 220 may include a monitor configured to display a user interface.

Memory 230 may include one or more storage devices configured to store instructions used by processor 210 to perform functions related to disclosed embodiments. For example, memory 230 may be configured with one or more software instructions associated with programs and/or data.

Memory 230 may include a single program that performs the functions of the server 200, or multiple programs. Additionally, processor 210 may execute one or more programs located remotely from server 200. Memory 230 may also store data that may reflect any type of information in any format that the system may use to perform operations consistent with disclosed embodiments. Memory 230 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with the disclosed embodiments, server 200 includes document data analyzer 232 configured to receive one or more documents, which in some embodiments may be received from a user device 300. For example, a user device 300 may upload one or more documents to a location accessible by server 200, such as by using a web portal or other interface. Also consistent with disclosed embodiments, server 200 may include statistic data analyzer 236, which may be configured to generate risk predictions, which may be based on model input data such as general ledger data. In some embodiments, document data analyzer 232 and/or statistic data analyzer 236 may be an application configured to operate a computerized model (e.g., a machine learning model). Document data analyzer 232 and/or statistic data analyzer 236 may be implemented as software (e.g., program codes stored in memory 230), hardware (e.g., a specialized chip incorporated in or in communication with processor 210), or a combination of both. Document data analyzer 232 and/or statistic data analyzer 236 may include any or all of modules described herein.

In some embodiments, document data analyzer 232 may include an analysis model 234, which may be a model having a structure, parameters, and/or any other configuration elements for generating predictive data related to documents. In some embodiments, statistic data analyzer 236 may include an analysis model 238, which may be a model having a structure, parameters, and/or any other configuration elements for generating predictive data related to institutional risks. Analysis model 234 and/or 238 may be, without limitation, any of a computer software module, an algorithm, a machine learning model, a data model, a statistical model, a natural language processing (NLP) module, k-nearest neighbors (KNN) model, a nearest centroid classifier model, a random forest model, an extreme gradient boosting model (XGBoost), a text clustering model, a recurrent neural network (RNN) model, a long-short term memory (LSTM) model, a convolutional neural network model, or another neural network model, consistent with disclosed embodiments. Analysis model 234 and/or 238 may be configured to predict performance of a single entity (e.g., bank) or multiple entities (e.g., multiple banks).

In some embodiments, a model (e.g., analysis model 234 and/or 238) may be a model in a learning stage or may have been trained to a degree (e.g., by a developer, a machine, or a combination of both). For example, training a model may include providing a model with model training input data, which may be unstructured or semi-structured (e.g., sourced from one or more documents) or structured (e.g., general ledger data, financial accounting metadata, etc., any of which may be from a bank). For example, statistic data analyzer 236 may receive input data that includes both structured and unstructured data, which may provide enhanced predictive performance. As another example, document data analyzer 232 may categorize one or more documents into high-level document types and may perform document analysis and extraction operations, consistent with disclosed embodiments, and as further detailed with respect to process 500. A model may use the model training input data to generate a model output (e.g., a risk level, contributing factors to a risk, a recommendation for reducing a risk, etc.). Model input training data may also not be associated with any specific document, and may be data from a general ledger of a bank. In some embodiments, a model may be trained using input data (e.g., document data, general ledger information, etc.) from a single source (e.g., a bank) or multiple sources (e.g., multiple banks). In some embodiments, such as where the training is supervised, a user may indicate an amount of accuracy of an output to the model (e.g., false positives, false negatives), which may be part of a recursive feedback loop to the model (e.g., as a subsequent input). In some embodiments, a developer may interact with a model to approve or disapprove of suggested changes to a model or parameters of a model (e.g., suggested by a machine). After such an interaction, the model may be updated to reflect the user interactions and/or machine inputs. In some embodiments, a model may continue to train until an output metric is satisfied (e.g., a threshold number or percentage of organizational failures are correctly predicted, a threshold number or percentage of risks or risk elevations are identified, a portion of text is correctly identified, a threshold number or percentage of training documents are accurately classified, a threshold number or percentage of loan defaults are correctly predicted, a threshold number or percentage of general ledger accounts are classified or categorized, etc.). In some embodiments, different output metric thresholds may be used for different types of categories, which may enhance predictive performance. A category may be a document category (e.g., a loan application, a new account application, etc.) or other data category (e.g., type of general ledger information, such as cash flow statistics). In some embodiments, a model may be a meta-model (e.g., a model of multiple bank-specific models). A model may be configured to generate particular analysis data, described below.

Server 200 may also be communicatively connected to one or more databases 240. For example, server 200 may be communicatively connected to database 240, which may be a database implemented in a computer system (e.g., a database server computer) in financial transaction system 102 and/or activity analysis platform 110. Database 240 may include one or more memory devices that store information and are accessed and/or managed through server 200. By way of example, database 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database 240 and to provide data from database 240. Server 200 may also include a communication interface (not shown), which may be implemented in a manner similar to communication interface 350 (described below), and may allow server 200 to connect to another server 200 or a user device 300.

In an example, document data analyzer 232 may include instructions to call an API for analyzing document data associated with an organization (e.g., a bank). In some embodiments, the API may communicate with financial transaction system 102 to verify document information and/or request additional data (e.g., additional documents, confirmation of document information, etc.). In some embodiments, API communications may be transmitted (e.g., via a mobile device application, a text message, a phone call, or the like) to a user device 300 or another server 200 (e.g., a processing device 104) 110 to be presented (e.g., displayed as text or graph, or played as sound) to a user. The API communication may include a request for additional information, and may include one or more of, for example, a first name, last name, account name, phone number, email address, passphrase, document identification number, financial amount, date, type of financial product (e.g., a loan), or financial product condition (e.g., an interest rate).

Figure 3:
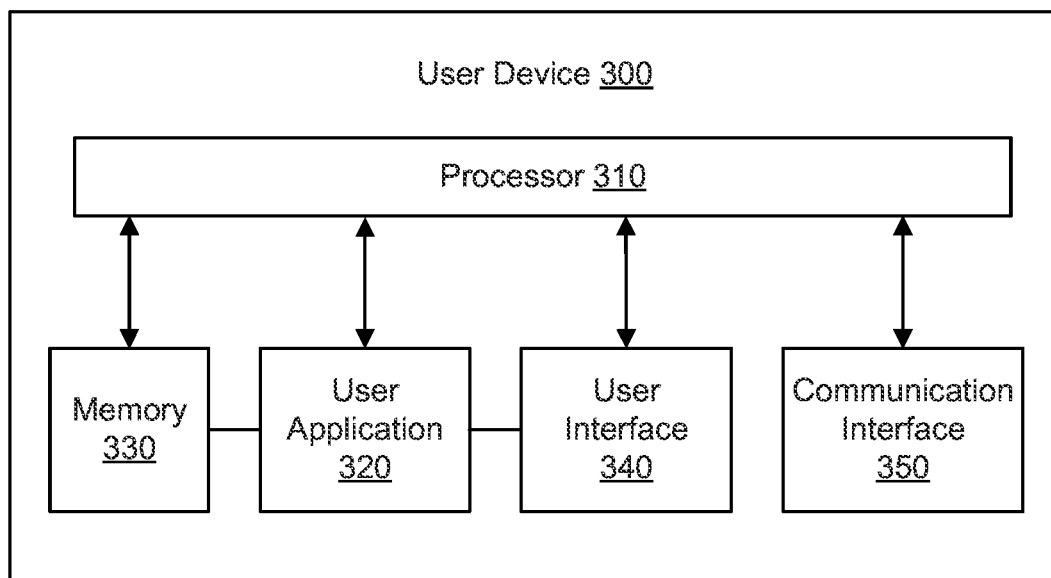
FIG. 3 is a block diagram of an example user device, consistent with the disclosed embodiments.

FIG. 3 is a block diagram of an example user device 300 used in system architecture 100, consistent with the disclosed embodiments. As shown in FIG. 3, user device 300 may include a hardware processor 310, a user application 320, a memory 330, a user interface 340, and a communication interface 350. In some embodiments, processor 310 may be implemented in a manner similar to processor 210, and memory 330 may be implemented in a manner similar to memory 230.

Processor 310 may include a digital signal processor, a microprocessor, or another appropriate processor to facilitate the execution of computer instructions encoded in a computer-readable medium. Processor 310 may be configured as a separate processor module dedicated to predicting risk based on extracted document data. Alternatively, processor 310 may be configured as a shared processor module for performing other functions of user device 300 unrelated to the disclosed methods for predicting risk based on extracted document data. In some embodiments, processor 310 may execute computer instructions (e.g., program codes) stored in memory 330, and may perform functions in accordance with example techniques described in this disclosure.

Memory 330 may include any appropriate type of mass storage provided to store information that processor 310 may need to operate. Memory 330 may be a volatile or non-volatile, magnetic, semiconductor, tape, optical, removable, non-removable, or another type of storage device or tangible (i.e., non-transitory) computer-readable medium including, but not limited to, a ROM, a flash memory, a dynamic RAM, and a static RAM. Memory 330 may be configured to store one or more computer programs that may be executed by processor 310 to perform the disclosed functions for predicting risk based on extracted document data.

User application 320 may be a module dedicated to performing functions related to predicting risk based on extracted document data (e.g., modifying model parameters, validating accuracy of model output, specifying a model objective, etc.). User application 320 may be configured as hardware, software, or a combination thereof. For example, user application 320 may be implemented as computer code stored in memory 330 and executable by processor 310. As another example, user application 320 may be implemented as a special-purpose processor, such as an application-specific integrated circuit (ASIC), dedicated to make an electronic payment. As yet another example, user application 320 may be implemented as an embedded system or firmware, and/or as part of a specialized computing device.

User interface 340 may include a graphical interface (e.g., a display panel), an audio interface (e.g., a speaker), or a haptic interface (e.g., a vibration motor). For example, the display panel may include a liquid crystal display (LCD), a light-emitting diode (LED), a plasma display, a projection, or any other type of display. The audio interface may include a microphone, speaker, and/or audio input/output (e.g., headphone jack).

User interface 340 may also be configured to receive input or commands from a user. For example, the display panel may be implemented as a touch screen to receive input signals from the user. The touch screen includes one or more touch sensors to sense touches, swipes, and other gestures on the touch screen. The touch sensors may sense not only a boundary of a touch or swipe action but also a period of time and a pressure associated with the touch or swipe action. Alternatively, or additionally, user interface 340 may include other input devices such as keyboards, buttons, joysticks, and/or trackballs. User interface 340 may be configured to send the user input to processor 310 and/or user application 320 (e.g., an electronic transaction application).

Communication interface 350 can access a network (e.g., network 120) based on one or more communication standards, such as WiFi, LTE, 2G, 3G, 4G, 5G, etc. Communication interface 350 may connect user device 300 to another user device 300 or a server 200. For example, communication interface 350 may connect one processing device to another (e.g., connect processing device 104 to another processing device 104, connect processing device 104 to processing device 114, etc.). In some embodiments, communication interface 350 may include a near field communication (NFC) module to facilitate short-range communications between user device 300 and other devices. In other embodiments, communication interface 350 may be implemented based on radio-frequency identification (RFID) technology, an infrared data association (IrDA) technology, an ultra-wideband (UWB) technology, a Bluetooth® technology, or other technologies.

Figure 4:
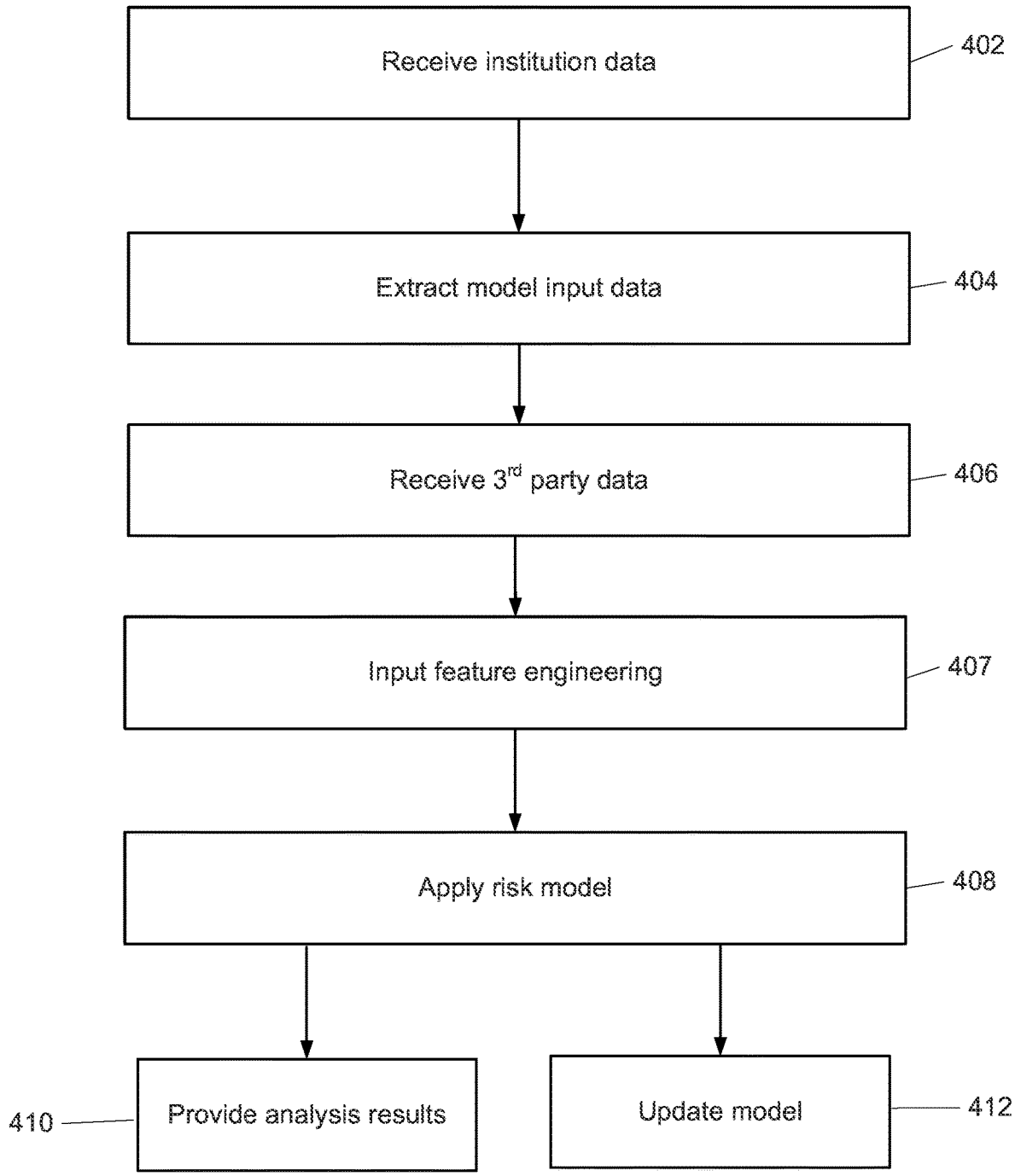
FIG. 4 is a flowchart of an example process for predicting institutional risk, consistent with the disclosed embodiments.

FIG. 4 is a flowchart of example process 400 for predicting institutional risk, consistent with the disclosed embodiments. Process 400 may be performed by a computer-implemented system (e.g., server 200) in financial transaction system 102 or activity analysis platform 110, or by an apparatus (e.g., user device 300). The computer-implemented system may include a memory (e.g., memory 230 or 330) that stores instructions and a processor (e.g., processor 210 or 310) programmed to execute the instructions to implement process 400. Process 400 may involve generating and/or displaying certain user interfaces, such as those shown in FIGS. 7A-7D (e.g., at step 414). Process 400 may be implemented as one or more software modules (e.g., an API in statistic data analyzer 236) stored in memory 230 and executable by processor 210. For ease of description, some steps of process 400 are described as performed by a particular device, such as processing device 114. However, it should be noted that any step may be executed by any device within system architecture 100, such as processing device 104. Process 400 may incorporate aspects of steps from other processes discussed herein. For example, providing the analysis results at step 410 may include aspects of providing analysis results as described with respect to step 512 of process 500.

Referring to process 400 shown in FIG. 4, at exemplary step 402, processing device 114 may receive institution data, which may be from a data source, and which may have been generated by a user device 300. Prior to receiving the institution data, processing device 114 may establish a connection between a system and a data source. In some embodiments, the data source (e.g., financial transaction system 102) may be remote from a system (e.g., activity analysis platform 110) and may also be associated with a first entity (e.g., a particular bank, lender, financial advisor, other financial institution, business, etc.). In some embodiments, processing device 114 may receive first institution data from a first entity (e.g., a bank), second institution data from a second entity, etc. In some embodiments, the first and second entities may be different financial institutions (e.g., banks), or other type of organization. In some embodiments, processing device 114 may receive institution document periodically (e.g., once every day, once every month, etc.) and/or in response to a request (e.g., a request sent from processing device 114 to processing device 104). In some embodiments, processing device 114 may transmit requests for institution data more frequently for institutions have a higher amount of predicted risk. In some embodiments, processing device may require different type of institution data with different amounts of frequency, for example, processing device 114 may receive an institution's accounts receivable subledger more frequently (e.g., daily) than an institution's fixed assets subledger (e.g., every two days). In this manner, networked devices may reduce bandwidth load created by transmission of unnecessary or repetitive data for a particular process (e.g., process 400).

In some embodiments, the institution data may be associated with a particular industry, such as financial services. For example, institution data may be associated with (e.g., may include) a general ledger, combination of subledgers (e.g., accounts receivable, accounts payable, fixed assets, etc.), statement of financial position, and/or income statement, any of which may be generated into structured data by an application at a processing device (e.g., processing device 104). As other non-limiting examples, institution data may be associated with (e.g., may include) loan history data for one or more loans, a financial asset, a financial liability, a deposit amount, net income during a time period, earnings during a time period, a loan type (e.g., mortgage, car loan, etc.), loan origination date, loan period, an amount of principal originated, a payment received, a late charge, a number of days past due, a call code, a credit scores, North American Industry Classification System (NAICS) data, etc.

Institution data may include semi-structured and/or structured data. As an example of semi-structured data, institution data may include loan data that identifies loan types, loan amounts, and loan origination dates for a plurality of loans within a set of fields, but is nonconforming to a data structure for which processing device 114 (or a system) is configured to accept as a valid input (e.g., for input to a data extraction process). In some embodiments, processing device 114 may convert semi-structured data into structured data usable for process 400 (e.g., implemented by statistic data analyzer 236). As an example of structured data, institution data may include a table or other data structure (e.g., Portable Document Format (PDF) file, Extensible Markup Language (XML) file) with data elements describing financial metrics of an institution (e.g., a total amount of assets, a total amount of liabilities, an amount of cashflow of actual payments received, an amount of scheduled cashflow, etc.). Such institutional data may have been used generated (e.g., at a user device 300), or machine-generated (e.g., generated automatically in response a system receiving an electronic payment, issuing a loan, etc.).

Referring again to process 400, at exemplary step 404, processing device 114 may extract model input data, which may be extracted from institution data. In some embodiments, processing device 114 may implement a machine learning model that uses a natural language processing (NLP) classifier to institution data to determine the model input data. For example, an NLP classifier may learn particular phrases or keywords in a specific context indicating, for example, an association between institution data (e.g., data received at step 402) and a type of general ledger data (e.g., a value related to accounts receivable, which may correspond to a field in a model input). In some embodiments, extracting model input data may include using a mapping between a data element of institution data and a model input data element (e.g., field). For example, the NLP classifier may generate a mapping between an institution data element and a model input, and such a mapping may be used in subsequent data extractions, or other iterations of a step in process 400 (or other process described herein). In some embodiments, processing device 114 may (e.g., using an NLP classifier) use text data (e.g., a general ledger account description) to construct and/or update a tree data structure representing institution data (e.g., a general ledger). Processing device 114 may extract a number of different model inputs for generating risk analysis information. For example, in contexts related to financial institutions, processing device 114 may extract model inputs from a general ledger of a bank or other financial institution. Continuing this example, processing device 114 may extract a cash management subledger from a general ledger. Model inputs may also include an account value, a transaction value, an asset value (e.g., home value), a current default rate, a current delinquency rate, a historical default rate, a historical delinquency rate, a payment date, a loan term, a loan type, a loan payment history (e.g., including a principal issuance, a payment received, a late charge, a number of days past due, a call code), an individual demographic trait (e.g., income amount), an economic statistic, a credit history, a credit score (e.g., at loan origination), a geographical identifier (e.g., zip code, city, state), ledger data (e.g., an income amount, an expense amount, an asset amount, a liability amount, a call report, an institution (e.g., bank) failure list, a capital ratio, a liquidity amount, a deposit amount, an enforcement action indicator. In some embodiments, extracted model inputs may be labeled and/or used as inputs for training a model.

In some embodiments, processing device 114 may determine that a machine learning model (e.g., a machine learning model implementing process 400) may have insufficient model input data to provide a model output of a threshold confidence. In these embodiments or others, processing device 114 may display a warning or otherwise notify a user (e.g., at user device 300). For example, processing device 114 may provide a user interface allowing a user of processing device 114 (e.g., an instance of user device 300) to request additional information (e.g., institution data, missing structured data information, unknown model inputs, or data undetermined due to an extraction error, etc.). For example, processing device 114 may provide a button within a user interface that, when selected by an input device, will prompt another device (e.g., a device within financial transaction system 102) for data, such as by transmitting an alert to the other device. In some embodiments, processing device 114 may prompt another device to resubmit institution data, such as by aggregating up-to-date transaction data from devices in financial transaction system 102. An example of button for prompting additional data is shown by the button labeled "Initiate New Records Request" in FIG. 7B. Additionally or alternatively, processing device 114 may (e.g., according to a machine learning model) may replace values and/or impute missing values using statistical (e.g., time series analysis) and/or machine-learning approaches using context from an institution or group of institutions (e.g., time of year, past trends, current trend, a model function, etc.).

Referring again to process 400, at exemplary step 406, processing device 114 may receive 3$^{rd}$ party data (e.g., from a 3$^{rd}$ party data provider 130). For example, processing device 114 may access supplemental data (e.g., non-institution data, data from a source other than a particular bank, etc.). For example, the supplemental data may be from an additional data source, and may relate to demographics (e.g., life expectancy for a particular geography) or economics (e.g., employment data, income data). 3$^{rd}$ party data may be an important source of additional model inputs, enabling processing device 114 to identify risks (as discussed below) that may otherwise be unapparent.

Referring again to process 400, at exemplary step 407, processing device 114 may input feature engineering, which may involve transforming raw data into more informative features, which may be used to improve a machine learning process. For example, inputting feature engineering may include any combination of handling of missing values or low quality data, such as by leveraging statistical imputation methods, transforming categorical data values into an appropriate format for statistical and/or machine learning models to process, scaling numerical values, normalizing data coming from different sources, creating new dynamic feature sets such as time lags or delta shifts between periods, determining simple moving averages or exponential moving averages, determining volatility or ranges in an input variable to describe time series data, and/or another data refinement operation. Feature engineering approaches may include both modifying input data as well as created new, derived data based on the given input data.

Referring again to process 400, at exemplary step 408, processing device 114 may apply a risk model (e.g., a machine learning model) to the extracted model data. For example, processing device 114 may apply a risk model to the extracted model input data to predict a risk level associated with an entity, such as a first entity associated with the first institution data received at step 402. In some embodiments, a risk model may include a z-score model, which may produce a risk score and/or z score for an entity, such as a bank. In some embodiments, the risk model may be a machine learning model that has been trained to predict risk levels using second institution data, which may have been received from the first entity and/or a second entity. For example, processing device 114 may operate a risk model that is trained and/or re-trained using institution data from one or multiple financial institutions, such as banks. Processing device 114 may operate a risk model whenever new data is received and/or periodically (e.g., daily, weekly, monthly).

In some embodiments, a risk model may use a combination of model inputs to generate an intermediate output. For example, a risk model may aggregate individual loan values to determine an impact to a liability value for an entity (e.g., bank). As another example, a risk model may apply an algorithm to extracted data to determine information associated with a particular bank, such as an amount of liquidity or total loan amounts owed. As yet another example, a risk model may filter model inputs to result in an intermediate output of data relating to a specific geographic area, which may have been selected by a user. A risk model may also calculate a change in a particular value over a period of time, such as, for example, a change in an accounts receivable amount over a past month.

The risk model may use a combination of model inputs and/or intermediate outputs to generate final outputs (e.g., analysis results). In some embodiments, the risk model may identify at least one correlation between at least one model input, or at least one change in at least one model input, and a failure, or riskiness, of a transaction, an asset, or an entity. For example, the risk model may be a machine learning model that is trained to predict a risk level based on a change in activity of an institution data source entity (e.g., a document source entity). Continuing this example and without limitation, the risk model may identify a correlation between a rate of change in loans closed over a period of time and a likelihood of an entity failure (e.g., a bank failure). Of course, categories of model inputs and/or intermediate outputs may be relatively broad (e.g., liquidity information, earnings information, credit risk information) or granular (e.g., residential real estate lending information, money market deposit values, cash position information, etc.) with respect to an institution.

In some embodiments, the risk model may apply statistical weighting and/or outlier approaches such as standard-deviations, Z scores, and other statistical distributions, to factor multiple underlying risk components into composite risk scores. For example, the risk model may predict a risk score or probability, which may correspond to a risk level (e.g., range of risk scores, which may be denoted as "high", "moderate", "low", etc.), and which may be included in analysis results. In some embodiments, processing device 114 may describe a risk score or risk level relative to a defined value (e.g., fixed value, variable, etc.), or may describe a risk score or risk level relative to risk scores or levels for other entities. For example, in some embodiments, processing device 114 may compute z-scores for one or more entities, and certain ranges of z-scores may correspond to a risk level. For example, a z-score of greater than zero and less than two may be considered low risk, a z-score of greater than or equal to two and less than or equal to 3.5 may be considered moderate risk, and a z-score of score greater than 3.5 may be considered high risk.

In some embodiments, the risk model may generate analysis data based on a predicted risk level. For example, the analysis data may include the predicted risk level. In some embodiments, a first model may be configured to generate an event-based classification output and a second model may be configured to generate a likelihood (e.g., probability) score (discussed above). For example, the first model may generate an event-based classification output that predicts an occurrence of an event (e.g., an expected default on a loan, a delinquency on a loan and significant change on a general ledger position, a significant outflow of deposits, a significant shift from less risky to more risky products.) In some embodiments, a processing device 114 may consolidate predicted risk-events and risk probabilities/ratios into higher-level risk scores, such as by utilizing statistical approaches. In some embodiments, a risk score may indicate a likelihood that a transaction, asset, or entity will fail (e.g., 30% chance a loan will be in default in the future), and the corresponding risk level may comprise a likelihood of failure (e.g., of a first entity). In some embodiments, processing device 114 may deploy a machine learning model to predict (e.g., using a labeled time-series data set for an institution and/or asset failures) a time in the future when the failure will occur, and may include this predicted value such that generated analysis data comprises a predicted amount of time until the failure of the first entity. Additionally or alternatively, a risk model may predict a change to at least one model input that may reduce a risk score, and may designate such a change as a recommendation with analysis results. Processing device 114 may provide different recommendations depending on a generated model output. For example, processing device 114 may generate a recommendation (e.g., for display at a user device 300) that an entity reduce its level of liabilities, which may be determined from institution data (e.g., a machine learning model may understand that liabilities have increased based on changes in general ledger data), to reduce a predicted risk of failure.

In some embodiments, the risk level may be predicted by applying the machine learning model to supplemental data. By way of example, processing device 114 may apply a machine learning model to Department of Labor statistics and identify a correlation between individuals earning a particular amount of income in a particular geographical area and a likelihood of loan repayment, which may in turn impact a likelihood of failure of an entity (e.g., a bank). Additionally or alternatively, processing device 114 may receive data from other entities (e.g., banks) similar to an entity providing the institution data.

In some embodiments, based on the analysis data, processing device 114 may transmit an alert to a management device (e.g., processing device 104) communicably connected to a system (e.g., activity analysis platform 110). In some embodiments processing device 114 may transmit alerts periodically. Additionally or alternatively, processing device 114 may transmit alerts when a transmission criterion is satisfied. For example, processing device 114 may transmit an alert when a generated risk level exceeds a threshold (e.g., is in a range above "low"). In some embodiments, an alert transmission threshold may be set by a user at a management device.

Referring again to process 400, at exemplary step 410, processing device 114 may provide analysis results, which may have been generated as a result of step 412. In some embodiments, analysis results may include any of the risk scores or risk levels described above. In some embodiments, processing device 114 may use the analysis data to generate a graphical user interface, which may include an amount of the analysis data (e.g., a list of institutions and corresponding risk scores) and/or model inputs (e.g., write-offs arranged by recency, loans arranged by loan type, loans arranged by NAICS sector, loans arranged by length of delinquency, etc.). Such a graphical user interface may include filters that may allow a user to select particular analysis results and/or surface data (e.g., model inputs) that impacted the analysis results. For example, a user may select a minimum risk score, and processing device 114 may provide analysis results for only institutions having a risk score at or above the user-selected minimum. In some embodiments, processing device 114 may filter analysis results to only include results for statistical outlier model outputs. Additionally or alternatively, the analysis results may include a graph, such as a line graph, that may chart a variable over time, such as a total value of outstanding loans, a number of loans opened, a number of loans closed, a number of new locations (e.g., bank branches opened), or any other information related to the model inputs discussed above. Additionally or alternatively, the analysis results may include a map, which may include a number of indicators placed on locations of areas of interest, such as locations of bank branches at a particular risk of failure. Additionally or alternatively, analysis results may include aggregated general ledger data for a bank or other institution, which may include changes to interest income, non-interest income, interest expenses, non-interest expenses, and/or other general ledger categories. In some embodiments, graphs and visualizations may be connected and surfaced depending on user interaction, allowing ad hoc exploration. For example, a user may select a graphical element (e.g., institution identifier) on a first user interface (e.g., a list of institutions and corresponding risk scores), which may surface a second user interface with different information, which may be specific to an institution (e.g., a graph of risk score changes over time, graphical indicators of data inputs underlying a risk score, a graphical element that launches a communication interface with the institution, etc.). As another example, a drill-down user selection on a chart of period-to-period change may reveal a detailed chart of changes in underlying, more detailed data categories, such as loan growth in a particular segment or deposit outflows in a particular type of account. In some embodiments, analysis results may include information from a third-party data source, which may be an entity not associated with institutions for whom risk scores are generated. For example, a processing device 114 may use an API to crawl data from a source of public corporate or regulatory filings (e.g., for inserting missing structured data for a user interface), latitude-longitude data (e.g., for generating a map of locations of interest), and the like. A processing device 114 may also generate mappings between unstructured information (e.g., document data associated with loans) and structured information (e.g., an asset described in a general ledger). FIGS. 7A-7D show yet additional examples of user interfaces that may present analysis results.

In some embodiments, processing device 114 may apply a natural language generation (NLG) process to model output from the machine learning model to produce at least one phrase, which may be included in the analysis results. For example, processing device 114 may apply an NLG process to a risk level output at step 412, which may generate a phrase helping a user to understand the analysis results. By way of example, applying an NLG process in this context may generate a phrase such as "risk level elevated to moderate one week ago" "consider monitoring more closely," or any of the phrases shown in FIGS. 7A-7D (e.g., "within the liquidity Z score, the most significant negative factor was a decrease in the Retained Earnings/Total Assets ratio").

Referring again to process 400, at exemplary step 412, processing device 114 may update a model. For example, processing device 114 may modify at least one model parameter based on a model output and/or user input. By way of example, processing device 114 may modify at least one model parameter based on a model output predicting that a particular bank will fail and a user input that the bank did not fail, or did not fail within a predicted timeframe. In some embodiments, processing device 114 may update a model based on data and/or user inputs from multiple entities, such as different financial transaction systems 102, which may be associated with multiple institutions (e.g., banks) across different geographies, who may maintain different assets, liabilities, etc. Regularly collecting new data (e.g., model inputs, model outputs) ma allow processing device 114 to maintain a more robust model to identify institutional risks before they are realized.

Figure 5:
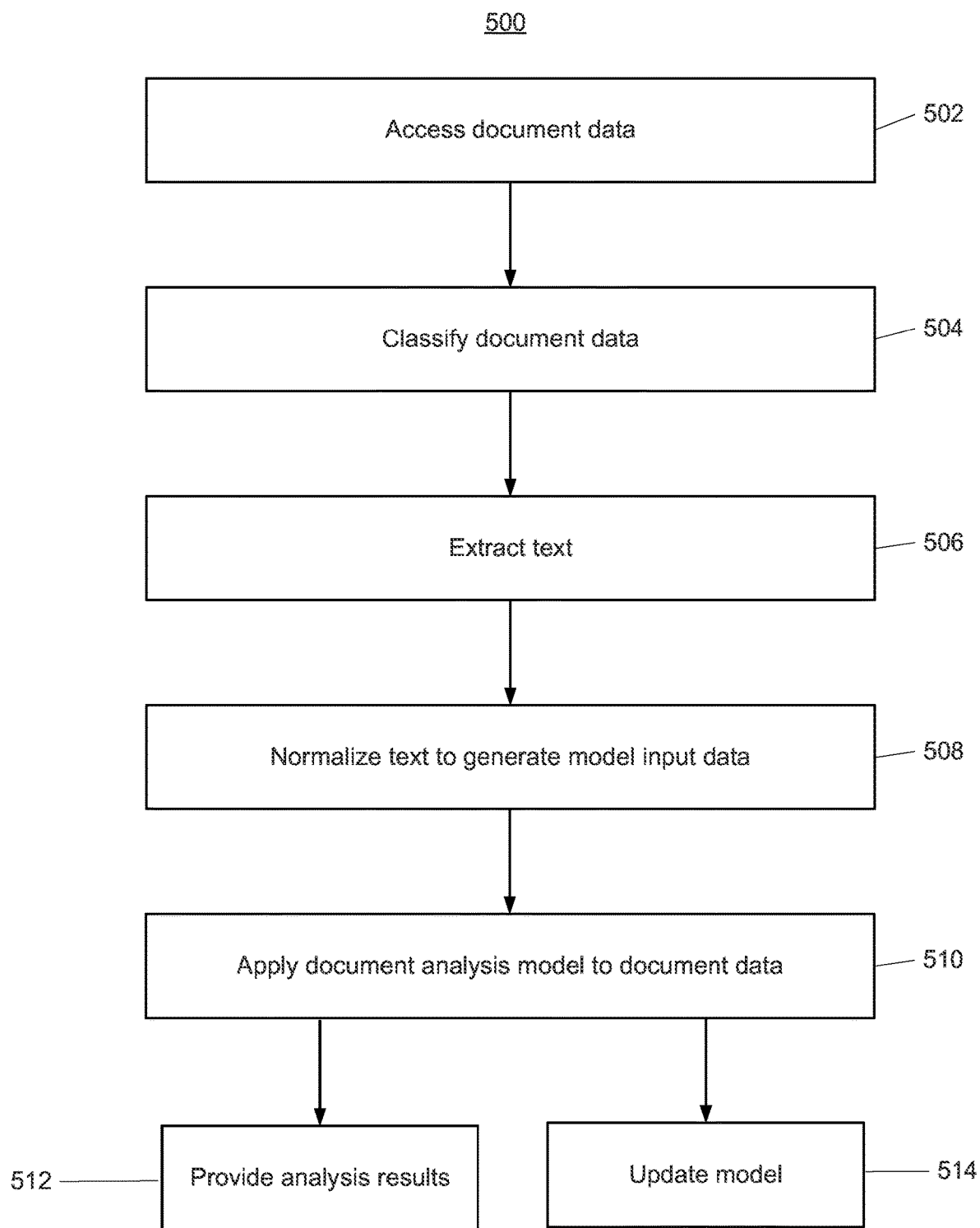
FIG. 5 is a flowchart of an example process for analyzing document data, consistent with the disclosed embodiments.

FIG. 5 is a flowchart of example process 500 for analyzing document data, consistent with the disclosed embodiments. Process 500 may be performed by a computer-implemented system (e.g., server 200) in financial transaction system 102 or activity analysis platform 110, or by an apparatus (e.g., user device 300). The computer-implemented system may include a memory (e.g., memory 230 or 330) that stores instructions and a processor (e.g., processor 210 or 310) programmed to execute the instructions to implement process 500. Process 500 may be connected to generating and/or displaying certain user interfaces, such as those shown in FIGS. 7A-7D. Process 500 may be implemented as one or more software modules (e.g., an API in document data analyzer 232) stored in memory 230 and executable by processor 210. For ease of description, some steps of process 500 are described as performed by a particular device, such processing device 104. However, it should be noted that any step may be executed by any device within system architecture 100, such as processing device 114. Process 500 may incorporate aspects of steps from other processes discussed herein. For example, providing the analysis results at step 512 may include aspects of providing analysis results as described with respect to step 410 of process 400.

Referring to process 500 shown in FIG. 5, at exemplary step 502, processing device 104 may access document data. In some embodiments, the document data may be associated with at least one of a transaction (e.g., a loan) or an individual. In some embodiments, the document data may be associated with a financial institution, such as a bank, which may host a financial transaction system 102. In some embodiments, document data may include an image or other digital representation of a physical document (e.g., a PDF document). In some embodiments, the document data may be associated with a particular industry, such as financial services. For example, the document data may be associated with at least one of a financial asset, a financial liability, net income during a time period, earnings during a time period, a loan, a deposit, or an expense.

Document data may include structured and/or unstructured data. As an example of unstructured data, document data may include an image of an individual's signature or handwritten notes (e.g., notes regarding a loan applicant). As an example of structured data, document data may include metadata associated with a document (e.g., a time the document was generated, an individual associated with the document, an institution associated with the document, a product associated with the document, etc.). Such metadata may have been user-generated (e.g., at a user device 300), or machine-generated.

Referring again to process 500 shown in FIG. 5, at exemplary step 504, processing device 104 may classify the document data (e.g., normalized document data from step 504). In some embodiments, such as prior to classifying the document data, processing device 104 may convert unstructured data to structured data. For example, processing device 104 may perform optical character recognition techniques to a document to identify text and create machine-readable text. In some embodiments, a machine learning-based classifier (e.g., a random forest classifier) may classify the document data. In some embodiments, processing device 104 may use a machine learning classifier to classify the document data. In some embodiments, classifying the normalized document data may include identifying at least one marker in the first document data. A marker may comprise a word, a phrase, a frequency of text, a position of text relative to a document, a position of text relative to other text in the document, a sentence, a number, a pictographic identifier, or any visual indicator, any of which may be correlated (e.g., using a machine learning model) with a document type (e.g., a loan application, an account opening, a loan closing document, etc.). In some embodiments, a marker may be associated with a document type based on user-created mappings between a marker or combination of markers and a document type. Such mappings may be maintained at memory 230, database 240, or any other storage device. Instead of or in addition to mappings, a marker may be associated with a document type based on a target keyword list or exception. Additionally or alternatively, a marker may be associated with a document type by a machine learning model, which may learn from document classifications and/or market-document type mappings made by users over time to generate new associations and/or association recommendations. For example, a model (e.g., analysis model 234) may be improved over time by flagging "false extractions" through user-based reviews of predictions to improve accuracy for types of documents that may be underperforming in an extraction process.

Referring again to process 500 shown in FIG. 5, at exemplary step 506, processing device 104 may extract text or other features from document data (e.g., classified document data), which may be used as model input data. For example, processing device 104 may extract text from classified (or unclassified) document data. In some embodiments, processing device 104 may select an extraction model (e.g., a model configured to extract text from document data) from among a plurality of candidate extraction models based on the classified document data. For example, processing device 104 may have access to multiple extraction models that have particularized parameters for different types of documents or different entities (e.g., financial institutions), and may select an extraction model designated (e.g., in a look-up table) for a particular document type (e.g., a loan closing document) and/or entity (e.g., bank), which may have been identified through the document data classification (e.g., at step 504). In some embodiments, processing device 104 may apply a natural language processing (NLP) method to classified document data to determine particular text. For example, an NLP method may learn particular phrases or keywords in a specific context having a higher importance for a document type, or a stronger impact on a model output. For example, processing device 104 may train an NLP model as part of a training stage and/or using new document data as it is received.

Processing device 104 may extract a number of different document features for generating risk analysis information. For example, in contexts related to financial institutions, extracted document features may include a parameter related to an account value, a transaction value, an asset value (e.g., home value), a payment date, a loan term, a loan payment history (e.g., including a principal issuance, a payment received, a late charge, a number of days past due, a call code), an individual demographic trait (e.g., income amount), an economic statistic, a credit history, a credit score, a geographical identifier (e.g., zip code, city, state), ledger data (e.g., an income amount, an expense amount, an asset amount, a liability amount, a call report, an institution (e.g., bank) failure list, a capital ratio, a liquidity amount, a deposit amount, or an enforcement action indicator.

Referring again to process 500 shown in FIG. 5, at exemplary step 508, processing device 104 may normalize the text or other features (e.g., extracted at step 506) to generate model input data. In some embodiments, normalizing the document data may comprise using regular expression parsing to extracted text to cleanse the text, which may make it more suitable as model input data. In some embodiments, processing device 104 may place particular text into designated fields. In some embodiments, processing device 104 may perform (e.g., after normalization) a targeted classification operation to map a field and/or text to a document type (e.g., for use in a classifier, such as discussed with respect to step 504). For example, processing device 104 may categorize a field (account or loan type, product type, etc.) using a model that is trained on with input data from one or more institutions (e.g., banks).

In some embodiments, processing device 104 may determine that a machine learning model (e.g., a machine learning model implementing process 400) may have insufficient model input data to provide a model output of a threshold confidence. In these embodiments or others, processing device 104 may display a warning or otherwise notify a user (e.g., at user device 300). For example, processing device 104 may provide a user interface allowing a user of processing device 104 (e.g., an instance of user device 300) to request additional information (e.g., document data, missing structured data information, unknown model inputs, or data undetermined due to a normalization error, classification error, extraction error, etc.). For example, processing device 104 may provide a button within a user interface that, when selected by an input device, will prompt another device (e.g., a device within financial transaction system 102) for data, such as by transmitting an alert to the other device. In some embodiments, processing device 104 may prompt another device to re-capture document data, such as by re scanning (e.g., with a document scanner, mobile device camera, etc.) a physical document. An example of button for prompting additional data is shown by the button labeled "Initiate New Records Request" in FIG. 7B. Additionally or alternatively, processing device 104 may (e.g., according to a machine learning model) may replace values and/or impute missing values using statistical (e.g., time series analysis) and/or machine-learning approaches using context from an institution or group of institutions (e.g., time of year, past trends, current trend, a model function, etc.).

Referring again to process 500 shown in FIG. 5, at exemplary step 510, processing device 104 may apply a document analysis model to the document data (e.g., classified document data). In some embodiments, processing device 104 may select a machine learning model from among a plurality of candidate machine learning models based on the classified document data. For example, processing device 104 may have access to multiple models that have particularized parameters for different types of documents or different entities (e.g., financial institutions), and may select a machine learning model designated (e.g., in a look-up table) for a particular document type (e.g., a loan closing document) and/or entity (e.g., bank), which may have been identified through the document data classification. In some embodiments, applying the document analysis model to document data may score the document. For example, the machine learning model may have been trained to generate a favorability output indicating a favorability (e.g., predicted revenue to be generated, predicted return on investment, predicted likelihood of repayment, predicted number of late payments, etc.) of the transaction (e.g., a loan application) or individual, and the favorability output may comprise an amount of risk associated with the transaction or individual. In some embodiments, the score of the document may relate to, for example, a predicted likelihood that an individual will pay back a loan, a predicted likelihood and/or frequency of late payments, or a predicted level of added risk to an entity (e.g., a bank). In some embodiments, a processing device 114 may implement a state transition model (Markov chain model), such as the state transition model shown in FIG. 8.

In some embodiments, the machine learning model may be trained to generate the favorability output using historical data at least a first financial institution associated with the document data or a second financial institution associated with additional document data. For example, the machine learning model may have been trained using input documents or other input data only from the entity (e.g., bank) from which the document data (e.g., loan data) is accessed at step 502. Additionally or alternatively, the machine learning model may have been trained using input documents or other input data from an entity other than an entity from which the document data was accessed at step 502.

In some embodiments, processing device 104 may apply document analysis model, or other model, that is trained to predict a change in model input data that will improve the favorability output. For example, a machine learning model may receive some model inputs, such as an age of a loan applicant, but may lack other model inputs, such as an amount of a loan previously paid off by the application. The machine learning model may predict that receiving certain additional model inputs (e.g., that the loan applicant paid back a $10,000 loan in the past two years) will lead to a change in the favorability (e.g., a prediction of risk to a bank presented by a loan applicant). In some embodiments, a machine learning model may predict actions that may improve a return on investment (ROI). For example, a machine learning model may learn through an iterative feedback loop of model inputs (e.g., comprising loan application document data, loan payment document data, etc.) that particular combinations of individual traits (e.g., income amount, geographical area, etc.), transaction parameters (e.g., loan amount, loan term, etc.), and like may be correlated with greater ROI, and may provide corresponding recommendations to a processing device (e.g., processing device 104), based on changes in model inputs predicted to yield a better model output (e.g., a higher ROI).

Referring to process 500 shown in FIG. 5, at exemplary step 512, processing device 104 may provide the analysis results. In some embodiments, processing device 104 may generate analysis data based on scored document data. In some embodiments, providing the analysis results may be based on an alert threshold (e.g., as discussed above with respect to process 400). For example, processing device 104 may determine whether the favorability output satisfies an alert criterion. If the favorability output satisfies the alert criterion, processing device 104 generate an alert at a display or other output device (e.g., user interface 340). In some embodiments, an analysis result visualization may be connected to another visualization, which may be surfaced depending on user interaction, allowing ad hoc exploration. For example, a user may select a graphical element (e.g., a loan category) on a first user interface, which may surface a second user interface with different information (e.g., a list of loans in the loan category having risk levels beyond a threshold). It is appreciated that analysis results and user interfaces of step 512 may include aspects discussed above with respect to process 400. For example, processing device 104 may provide a map (e.g., a map of bank branches with riskier loan portfolios) as part of the analysis results.

Referring to process 500 shown in FIG. 5, at exemplary step 514, processing device 104 may update a model. For example, processing device 104 may modify at least one model parameter based on a model output and/or user input. By way of example and not limitation, processing device 114 may modify at least one model parameter based on a model output predicting that a particular individual will miss a loan payment in the next six months and a user input that the individual made all scheduled payments for six months. In some embodiments, processing device 104 may update a model based on data and/or user inputs from multiple entities, such as different financial transaction systems 102, which may be associated with a same institution (e.g., bank) distributed across different geographies (e.g., different bank branches), who may maintain different assets, liabilities, etc.

Regularly collecting new data (e.g., model inputs, model outputs) may allow processing device 104 to maintain a more robust model to identify a risk presented by a transaction or individual.

Figure 6:
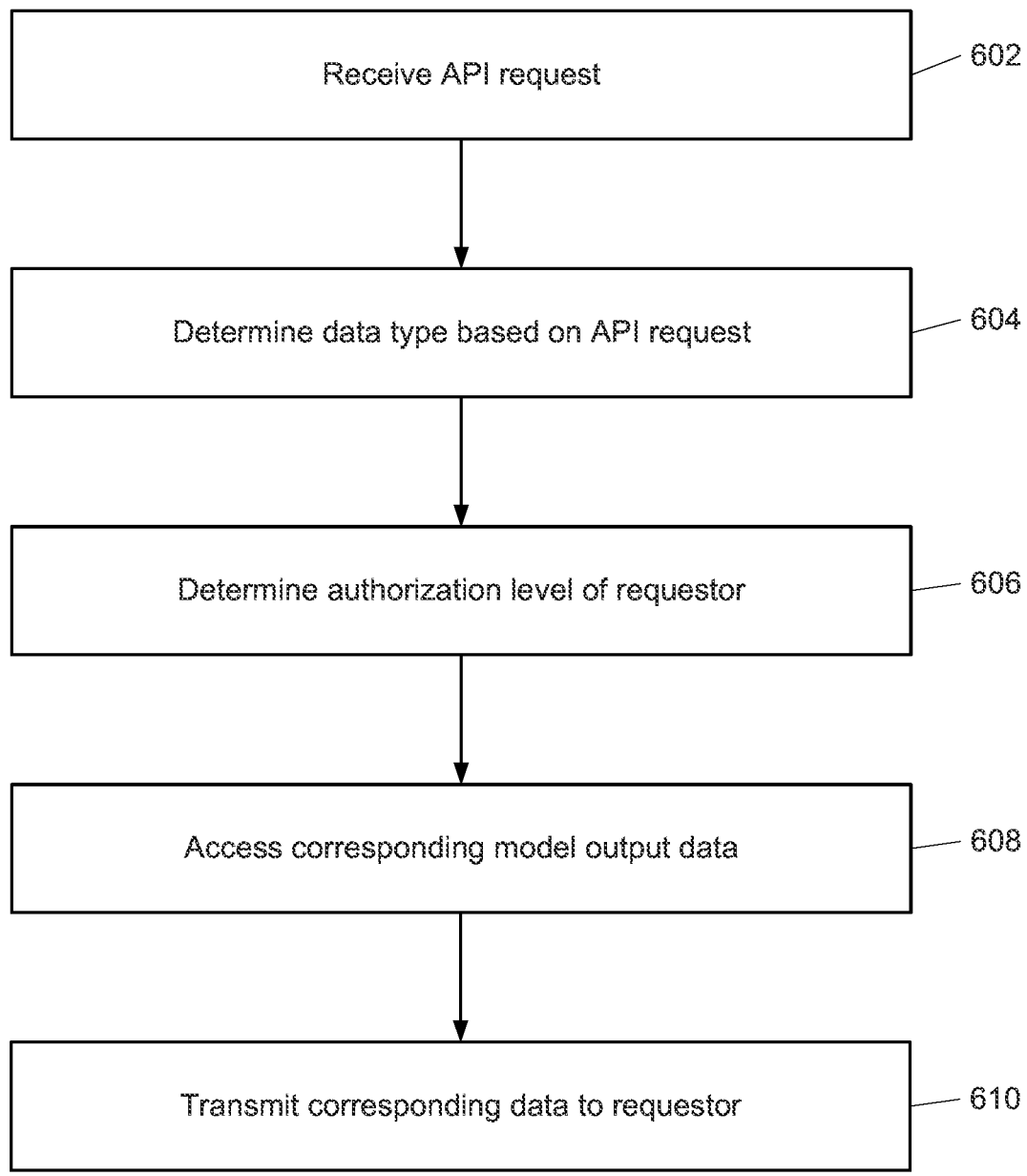
FIG. 6 is a flowchart of an example process for coordinating analysis data delivery access, consistent with the disclosed embodiments.
Figure 7B:
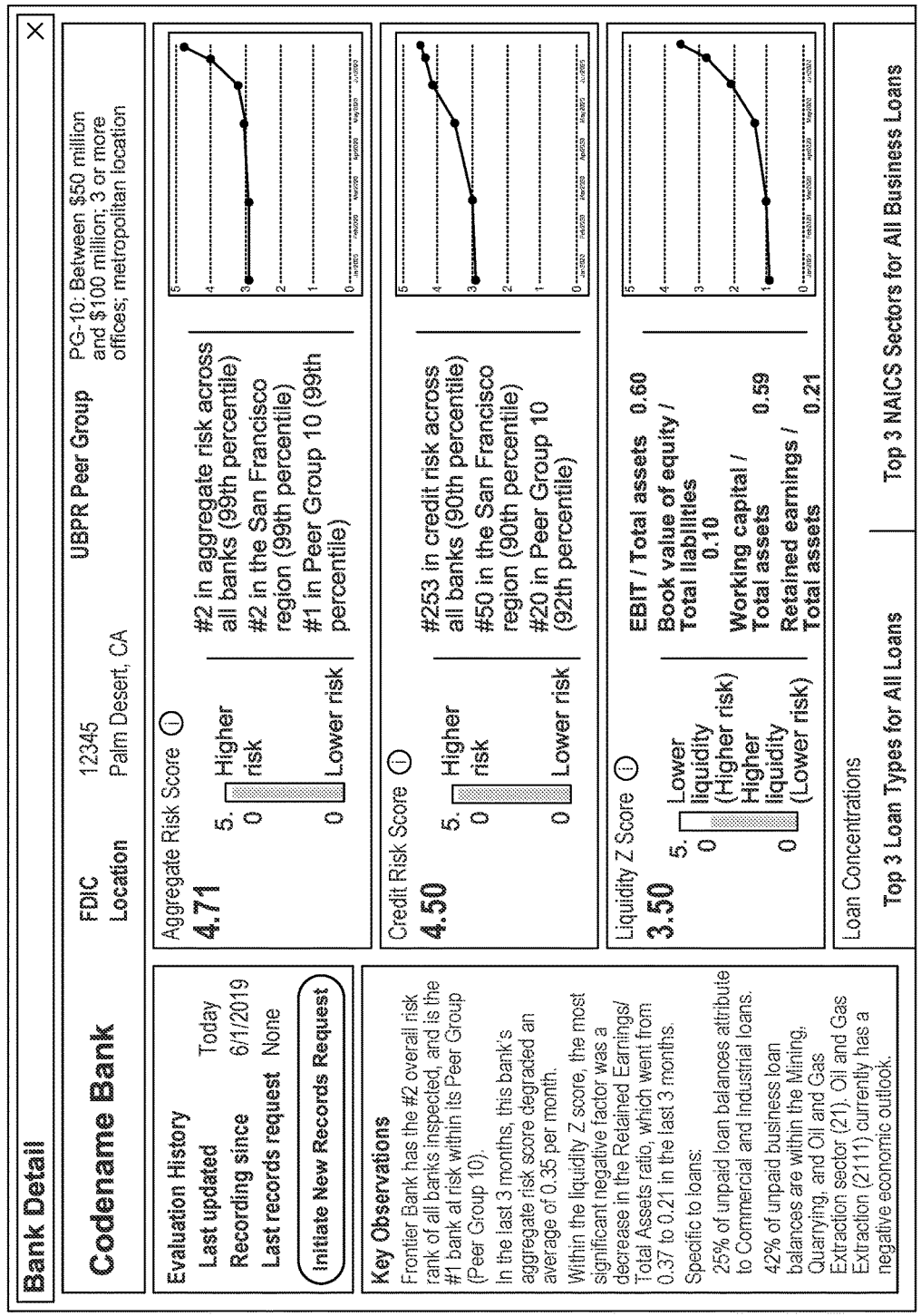
Figure 7C:
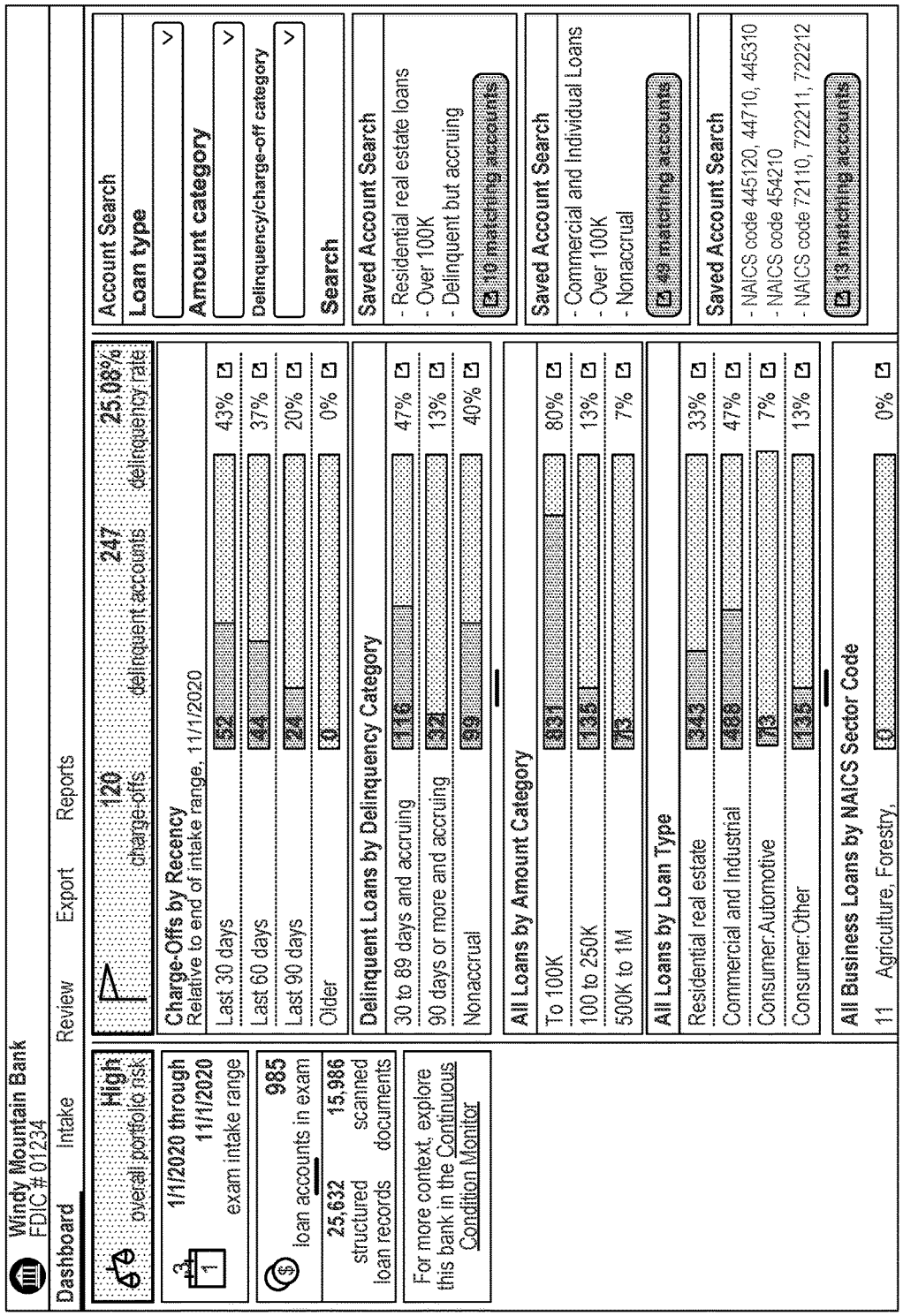

FIG. 6 is a flowchart of example process 600 for coordinating analysis data delivery access, consistent with the disclosed embodiments. Process 600 may be performed by a computer-implemented system (e.g., server 200) in financial transaction system 102 or activity analysis platform 110, or by an apparatus (e.g., user device 300). The computer-implemented system may include a memory (e.g., memory 230 or 330) that stores instructions and a processor (e.g., processor 210 or 310) programmed to execute the instructions to implement process 600. Process 600 may be implemented as one or more software modules (e.g., an API in document data analyzer 232) stored in memory 230 and executable by processor 210. For ease of description, some steps of process 600 are described as performed by a particular device, such as processing device 104 or 114. However, it should be noted that any step may be executed by any device within system architecture 100, such as processing device 114. While process 600 is described with respect to APIs, it should be noted that website uploads, a file transfer protocol (FTP) process using inter-system messages, or another other form of suitable electronic communications may be used.

Referring to process 600 shown in FIG. 6, at step 602, processing device 104 may receive an API request. In some embodiments, the API request may be sent from a requestor device (e.g., processing device 104), and may be received through an API. The API request may be an API request for data and may identify a requestor entity (e.g., a bank) associated with the requestor device. By requesting data using an API, a requestor device may eliminate a need to have a particular program stored locally (e.g., a particular module), which may need frequent updates, or which may pull data at a faster rate than desired, thus unnecessarily burdening bandwidth. Moreover, as further explained below, an API request may be a request for specific datasets, which reduce the size of datasets that may otherwise be automatically sent to a requestor device. In some embodiments, an API request may include unstructured data (e.g., data from a scanned document), semi-structured data, or structured data.

Referring again to process 600 shown in FIG. 6, at step 604, processing device 114 may determine a data type based on an API request (e.g., received at step 602). In some embodiments, processing device 114 may determine the data type based on at least one data type parameter in the API request. A parameter in the API request may identify at least one of: a timeframe, a geographical area, a financial institution, an asset value, an asset value change, a liability value, a liability value change, a loan, a deposit, an expense, or a risk level threshold. In one embodiment, the API request may be a request for normalized data as a service, which may involve a request to APIs that provide processes and services for generating normalized and high-quality data originating from banking cores and document repository in a format for further analysis or modeling in a client application or platform (e.g., modeling, visualization, reporting of normalized, granular data, etc.). For example, an API request may have one or more fields, or other data structures, that indicate a particular dataset configuration (e.g., one or more data types) requested. Continuing this example, an API request may indicate a request for an anonymized aggregated dataset of the changes to total assets in liabilities for banks over the past year. In another embodiments, the API request may be a request for risk data as a service, which may involve a request to APIs providing model output, risk scoring output, a list of high-risk accounts and/or loans, and the like, as well as various aggregations of this data such as by geography, institution, peer group, or loan category.

Referring again to process 600 shown in FIG. 6, at step 606, processing device 104 may determine an authorization level of a requestor (e.g., a device from which the API request was received at step 602). In some embodiments, processing device 104 may only allow requestor devices to access certain datasets, depending on the authorization level of the requestor. For example, processing device 104 may maintain (e.g., in database 240) a group of mappings between various authorization levels and data types. By way of example, a "general statistics" authorization level may be mapped to data types such as an average change in new loan offerings over time, but may not be mapped to data types such as geographic filters.

Referring again to process 600 shown in FIG. 6, at step 608, processing device 114 may access corresponding model output data, with may correspond to the data type and authorization level determined at steps 604 and 606. For example, processing device 114 may retrieve data from a data storage device (e.g., database 240), or may generate data (e.g., model output data) on demand. In some embodiments, processing device 114 may determine that the authorization level of the requestor device does not map to a data type in the API request, and may deny access of the requestor device to that data type. Processing device 114 may also deny access where no authorization level is denoted in the API request.

In some embodiments, the model output data may have been generated by a machine learning model (e.g., implemented by processing device 114) trained to predict a risk level based on document data. For example, the model output data may comprise analysis results, discussed above with respect to processes 400 and 500. In some embodiments, the document data may be extracted from one or more documents according to a natural language processing (NLP) technique, such as those discussed above with respect to processes 400 and 500. In some embodiments, the model output data may include at least one metric associated with an entity providing the document data. For example, the model output data may include a predicted risk score or risk level, a predicted trend for an institutional metric (assets, liabilities, loans opened, loans closed, financial products sold, etc.), a recommendation for changing an institutional metric based on a predicted model output, or any other data described herein.

In some embodiments, a processing device 114 responding to an API request may apply a machine learning model to predict a change in at least one metric (e.g., institutional metric) based on first and second model output data. For example, a change in at least one metric may be based on first model output data generated by a machine learning model configured to analyze loan applications and second model output data generated by a machine learning model configured to analyze new savings account openings. In some embodiments, processing device 114 may apply a machine learning model that is trained to predict a plurality of risk levels based on the document data (e.g., document data extracted from loan applications, payment confirmations, account opening papers, etc.). In some embodiments, the document data may be from different financial institutions (e.g., banks). Additionally or alternatively, a machine learning model (e.g., a source of the model output data accessed) may be further trained to predict a risk level based on demographic or economic data, as discussed above with respect to process 400.

In some embodiments, processing device 114 may determine a format associated with a requestor device and/or requestor entity. For example, the requestor device (e.g., processing device 104) may host an API not implemented by processing device 114, which may have particular formatting criteria for received data, such that it can be useable by the requestor device API. For example, processing device 114 may change a data sequence, configure data into a particular structure (e.g., table, linked-list, array, stack, queue, tree, graph, etc.), add header information to a data stream, apply a signature operation to data (e.g., hash function), or take another other action to generate a data stream and/or data batch that is usable by a requestor device (e.g. an API of the requestor device). In this manner, disparate systems may be made compatible for effective information exchange.

In some embodiments, processing device 114 may determine entity-identifying information in the model output data, such as individual names, addresses, Social Security numbers, etc. In some embodiments, entity-identifying information may be associated with individuals who are customers of different financial institutions, but the received API request may be from a single financial institution requesting data generated based on information received from multiple financial institutions. In these or other situations, processing device 114 may anonymize model output data prior to transmitting the model output to the requestor device (e.g., at step 610). In this manner, a single financial institution may be able to access predictive data generated by a machine learning model using de-anonymized model input data from multiple financial institutions, without disclosing any de-anonymized individual or financial institution-specific data.

Referring again to process 600 shown in FIG. 6, at step 610, processing device 114 may transmit corresponding data to the requestor. In some embodiments, processing device 114 may transmit the corresponding data to the same requestor device from which the API request was received, but, additionally or alternatively, may transmit the corresponding data to another device, such as a device associated with a same entity as the requestor device (e.g., another device hosted by a same financial institution as the requestor device). In some embodiments, processing device 114 may transmit a predicted change in at least one metric to a requestor device. In some embodiments, prior to transmitting the first model output, processing device 114 may reformat model output data to satisfy a format associated with the requestor device (as discussed above with respect to step 608).

FIGS. 7A-7D depict example interfaces 700A, 700B, 700C, and 700D, any or all of which may be presented on user device 300, consistent with the disclosed embodiments. For example, user device 300 may be a smartphone associated with a user, and any of interfaces 700A-700D may be displayed on user interface 340 (e.g., a display panel or a touchscreen). Any or all of these user interfaces may include data included in process 400 and/or 500 (e.g., a risk level, a model input value, etc.).

Example interface 700A depicts a ranked list view, which may display a number of institutions (e.g., financial institutions such as banks) and associated information, such as analysis results generated by a machine learning model. For example, interface 700A may rank institutions by an amount of predicted risk, and may include amounts of change in risk over a particular period of time (e.g., three months). Interface 700A may include other information related to a predicted risk or an institution, such as a z-score, a percentile ranking, an institutional metric (e.g., variance in risk score, total amount of new loans issued, etc.), In some embodiments, interface 700A may include filters, drop-down menus, or other interactable user interface elements, which may allow a user to determine particular criteria for accessing and/or generating certain analysis results. In some embodiments, a processing device (e.g., 104 or 114) may provide any or all of the information displayed in interface 700A (e.g., as part of process 400, 500, or 600). For example, processing device 114 may display model output information in interface 700A at step 414.

Example interface 700B depicts an institution detail view, which may display information associated with a particular institution (e.g., a bank), some or all of which may have been generated by a machine learning model. For example, interface 700B may include an aggregate risk score, credit risk score, earnings risk score, liquidity Z risk score, or any other metric associated with institutional risk, any of which may be associated with a particular bank. In some embodiments, interface 700B may also include graphs showing a change in risk level (e.g., as determined by a machine learning model according to process 400) over a certain period of time. In some embodiments, interface 700B may also present information in the form of words or graphics that compares particular metrics of one institution to another institution, or to a group of similar institutions (e.g., based on amount of assets, location, etc.). Additionally or alternatively, interface 700B may include text produced through NLG, as described above. In some embodiments, a processing device (e.g., 104 or 114) may provide any or all of the information displayed in interface 700B (e.g., as part of process 400, 500, or 600). For example, processing device 114 may display model output information in interface 700B at step 414.

Example interface 700C depicts an institution dashboard view, which may also display information associated with a particular institution (e.g., a bank), some or all of which may have been generated by a machine learning model. For example, interface 700C may display an overall portfolio risk generated by a machine learning model using model inputs such as amounts and timings of charge-offs, delinquent loan information, loan amounts, types of loans, and the like. Interface 700C may include a search bar that allows a user to search for particular document data (e.g., data extracted from a loan application) associated with an institution (e.g., a bank). In some embodiments interface 700C may display search result information or a user interface element that, when selected, displays search result information, such as particular financial transactions, institutions, or risk-related information. In some embodiments, interface 700C may display input data to a model, such as a scanned document, structured data associated with a document, and/or requested document data. In some embodiments, a processing device (e.g., 104 or 114) may provide any or all of the information displayed in interface 700C (e.g., as part of process 400, 500, or 600). For example, processing device 114 may display model output information in interface 700C at step 414.

Example interface 700D depicts a search result view, which may display document information associated with one or more institutions. In some embodiments, interface 700D may be displayed in response to a user action taken at another user interface (e.g., a search entered at interface 700C). For example, a user may enter search parameters related to loan information at interface 700C and interface 700D may be generated in response. As seen in FIG. 7D, interface 700D may display information associated with a document or group of documents, such as loans, including a product type, a call code, a name, any of the other column descriptors in FIG. 7D, or any other information describing a trait of a document, which may have been determined according to a combination of OCR, NLP, and machine learning techniques (e.g., according to process 400 or 500, described above). In some embodiments, interface 700D may include one or more buttons or other interactable user interface elements that may provide certain functionality. For example, user interface 700D may include a button that, when selected, generates a virtual binder or adds a data element (e.g., a data element associated with a loan) to a virtual binder. In some embodiments, a processing device (e.g., 104 or 114) may provide any or all of the information displayed in interface 700D (e.g., as part of process 400, 500, or 600). For example, processing device 114 may display model output information in interface 700D at step 414.

Figure 8:
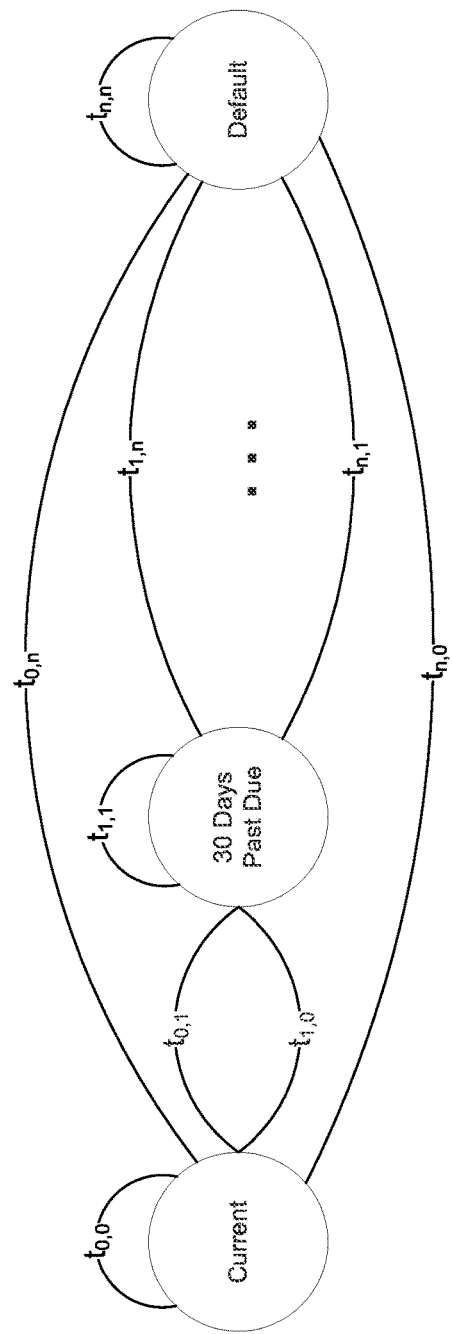
FIG. 8 depicts an example diagram of a borrower state transition model, consistent with the disclosed embodiments.

FIG. 8 depicts an example diagram of a borrower state transition model 800, consistent with the disclosed embodiments. Borrower state transition model 800 may statistically model (e.g., according to a Markov chain) the likelihood that a borrower will transition between different borrowing states. In some embodiments, transition probabilities ($t_{0,1}$, $t_{n,n}$, etc.) may be based on predictions may be based on data extracted from documents (e.g., according to process 400). In some embodiments, borrower state transition model 800 may be implemented through a module, program, application, or other computer code. For example, processing device 114 may execute a module that implements borrower state transition model 800, to predict whether a particular individual or group of individuals may default on a loan. In some embodiments, processing device 114 may implement a module corresponding to borrower state transition model 800 as part of process 400, or any other process described herein. Of course, other stochastic models, or other models altogether, may be used.

A non-transitory computer-readable medium may be provided that stores instructions for a processor (e.g., processor 210 or 310) for processing a financial transaction according to the example flowcharts of FIGS. 4-6 above, consistent with embodiments in the present disclosure. For example, the instructions stored in the non-transitory computer-readable medium may be executed by the processor for performing processes 400, 500, or 600 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, Hypertext Markup Language (HTML), HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods, or portions of the steps of the disclosed methods, may be modified in any manner, including by reordering steps, inserting steps, repeating steps, and/or deleting steps (including between steps of different exemplary methods). It is intended, therefore, that the specification and examples be considered as illustrative only, with a true scope and spirit being indicated by the following claims and their full scope of equivalents.

What is claimed is:

1. A system for entity risk management, the system comprising:
   at least one processor;
   a display; and
   a non-transitory computer-readable medium containing instructions that, when executed by the at least one processor, cause the at least one processor to perform operations comprising:
   accessing document data associated with at least one of a transaction or an individual;
   normalizing the document data;
   classifying the normalized document data;
   extracting model input data from the classified document data;
   selecting, based on the classified document data, a machine learning model from among a plurality of machine learning models, the machine learning model having been trained with document data of a same document type as the classified document data;
   applying the selected machine learning model to the extracted model input data to score the document data to generate a favorability output indicating a favorability of the transaction or individual, wherein the favorability output comprises an amount of risk associated with the transaction or individual;
   generating analysis data based on the scored document data;
   updating the selected machine learning model by modifying at least one model parameter based on the favorability output;
   determine whether the favorability output satisfies an alert criterion; and if the favorability output satisfies the alert criterion, generate an alert at the display.

2. The system of claim 1, wherein:
the document data comprises unstructured data;
normalizing the document data comprises converting the unstructured data to structured data; and
classifying the normalized document data comprises identifying at least one marker in the document data.

3. The system of claim 2, wherein the at least one marker includes a word, a phrase, a frequency of text, a position of text relative to a document, a position of text relative to other text in the document, a sentence, a number, or a pictographic identifier.

4. The system of claim 2, wherein classifying the normalized document data comprises classifying the normalized document data as associated with a loan based on the at least one marker.

5. The system of claim 1, wherein the non-transitory computer-readable medium contains further instructions that, when executed by the at least one processor, cause the at least one processor to apply a natural language processing (NLP) method to the classified document data to determine the model input data.

6. The system of claim 1, wherein:
classifying the normalized document data comprises identifying at least one marker in the document data; and
an additional machine learning model associates the at least one marker with a document type.

7. The system of claim 1, wherein the machine learning model was trained to generate the favorability output using historical data from at least one of:
a first financial institution associated with the document data; or
a second financial institution associated with additional document data.

8. The system of claim 1, wherein:
the document data is associated with a financial institution; and
the machine learning model is trained to predict a change in model input data that will improve the favorability output.

9. A method for entity risk management, comprising:
accessing document data associated with at least one of a transaction or an individual;
normalizing the document data;
classifying the normalized document data;
extracting model input data from the classified document data;
selecting, based on the classified document data, a machine learning model from among a plurality of machine learning models, the machine learning model having been trained with document data of a same document type as the classified document data;
applying the selected machine learning model to the extracted model input data to score the document data to generate a favorability output indicating a favorability of the transaction or individual, wherein the favorability output comprises an amount of risk associated with the transaction or individual;
generating analysis data based on the scored document data;
updating the selected machine learning model by modifying at least one model parameter based on the favorability output;
determining whether the favorability output satisfies an alert criterion; and
if the favorability output satisfies the alert criterion, generating an alert.

10. The method of claim 9, wherein:
the document data comprises unstructured data;
normalizing the document data comprises converting the unstructured data to structured data; and
classifying the normalized document data comprises identifying at least one marker in the first document data.

11. The method of claim 10, wherein the at least one marker includes a word, a phrase, a frequency of text, a position of text relative to a document, a position of text relative to other text in the document, a sentence, a number, or a pictographic identifier.

12. The method of claim 10, wherein classifying the normalized document data comprises classifying the normalized document data as associated with a loan based on the at least one marker.

13. The method of claim 9, further comprising applying a natural language processing (NLP) method to the classified document data to determine the model input data.

14. The method of claim 9, wherein:
classifying the normalized document data comprises identifying at least one marker in the document data; and
an additional machine learning model associates the at least one marker with a document type.

15. The method of claim 9, wherein the machine learning model was trained to generate the favorability output using historical data from at least one of:
a first financial institution associated with the document data; or
a second financial institution associated with additional document data.

16. The method of claim 9, wherein:
the document data is associated with a financial institution; and
the machine learning model is trained to predict a change in model input data that will improve the favorability output.

* * * * *